Aug. 13, 1935.  A. R. VAN C. WARRINGTON  2,011,387
PROTECTIVE APPARATUS FOR ELECTRIC SYSTEMS
Original Filed June 11, 1932   2 Sheets-Sheet 1
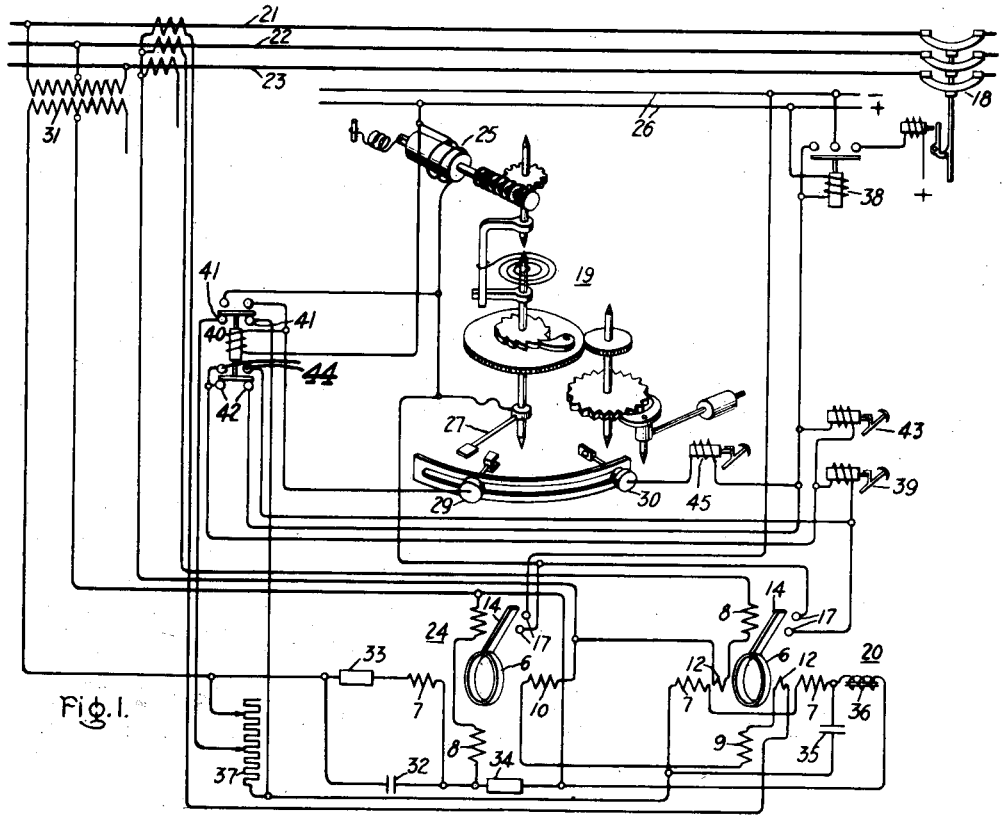
Fig.1.
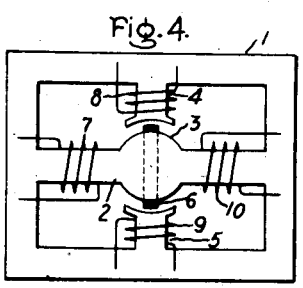
Fig.4.
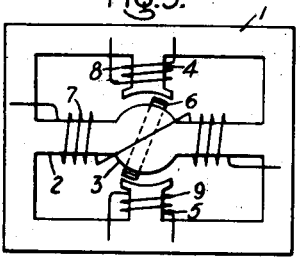
Fig.5.
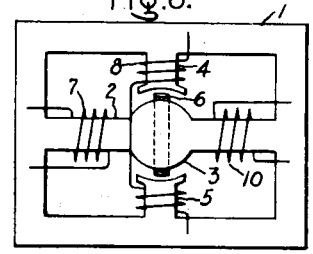
Fig.6.
Fig.7.
Inventor:
Albert R. van C. Warrington,
by Harry E. Dunham
His Attorney Aug. 13, 1935.  A. R. VAN C. WARRINGTON  2,011,387
PROTECTIVE APPARATUS FOR ELECTRIC SYSTEMS
Original Filed June 11, 1932   2 Sheets-Sheet 2

Inventor:
Albert R. van C. Warrington,
by Harry E. Dunham
His Attorney

Patented Aug. 13, 1935

2,011,387

UNITED STATES PATENT OFFICE 2,011,387

PROTECTIVE APPARATUS FOR ELECTRIC SYSTEMS

Albert R. van C. Warrington, Media, Pa., assignor to General Electric Company, a corporation of New York Original application June 11, 1932, Serial No. 616,612. Divided and this application September 13, 1934, Serial No. 743,830

8 Claims. (Cl. 175—294)

My invention relates to improvements in protective apparatus for electric systems and more particularly to fault-responsive protective apparatus for controlling electric circuits in accordance with the distance between the apparatus and the fault.

Power surges attendant on switching operations and subsequent to the clearing of faults frequently present the very phenomena for which fault responsive protective apparatus, and particularly directional-distance responsive apparatus, is supposed to function. In consequence, such apparatus has a tendency to operate at inopportune times, thereby interrupting the much desired continuity of service over sound portions of the power system. It has been found that faults are accompanied by low voltages and low power factors, whereas surges generally involve higher voltages and power factors. An object of my invention is to eliminate this undesired operation on the surges by providing improved fault responsive protective apparatus which distinguishes between voltage and current fluctuations accompanying surges and faults. Other objects of my invention will appear hereinafter.

This application is a division of my application Serial No. 616,612, filed June 11, 1932, for electroresponsive devices.

My invention will be better understood from the following description when considered in connection with the accompanying drawing, and its scope will be pointed out in the appended claims.

Figure 3:
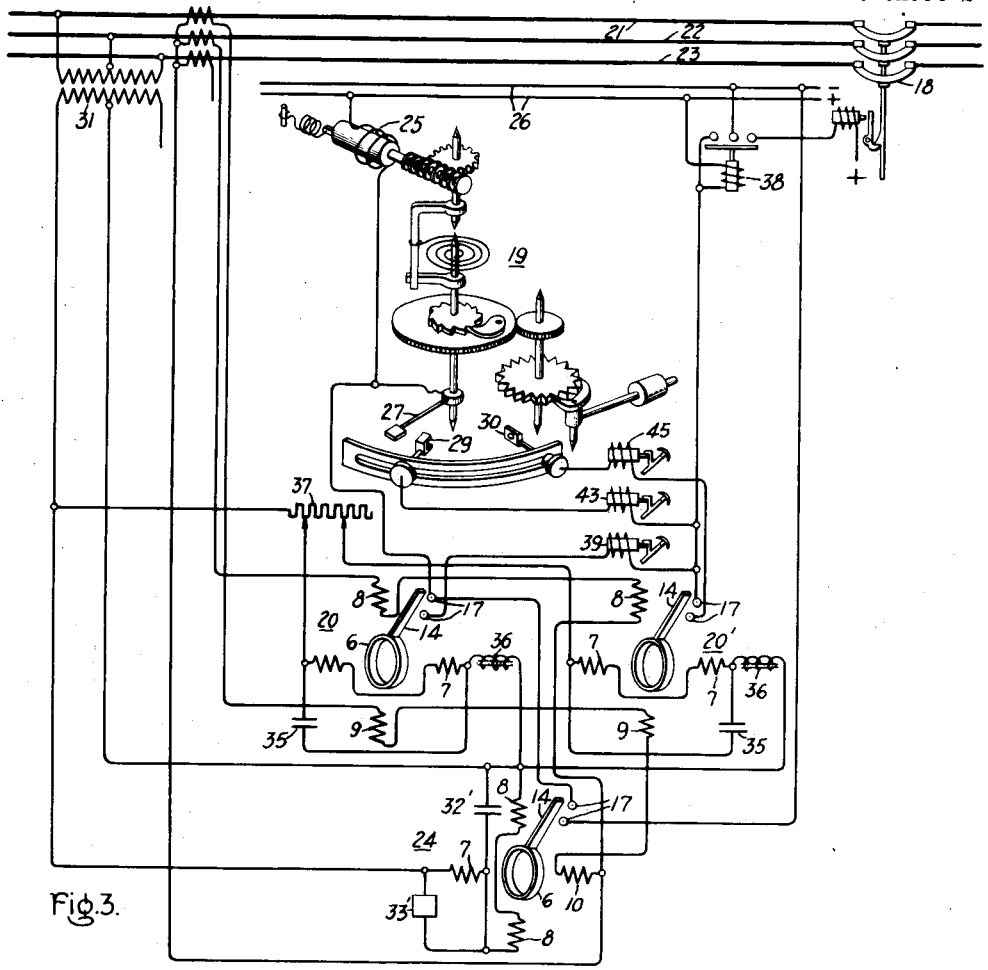
Figure 2:
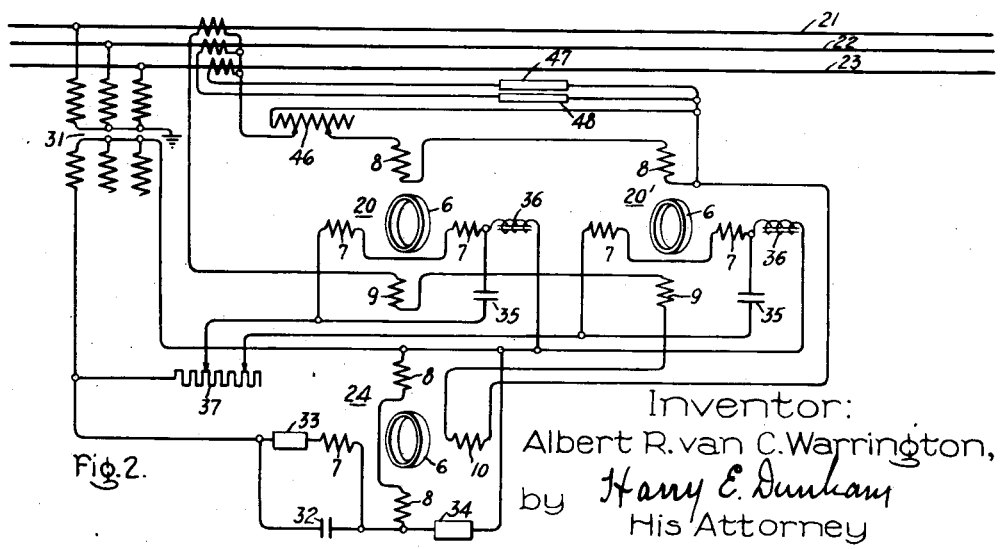

In the accompanying drawing, Fig. 1 illustrates diagrammatically fault responsive protective apparatus embodying my invention; Figs. 2 and 3 illustrate diagrammatically modifications of my invention, and Figs. 4, 5, 6 and 7 illustrate schematically relay means disclosed in the parent application and particularly suited for use in protective apparatus embodying my invention.

In order more clearly to understand the protective apparatus shown in Figs. 1, 2 and 3, the relay means schematically illustrated in Figs. 4, 5, 6 and 7 will first be described. The relay means illustrated are of the induction dynamometer type wherein by transformer action with one or more suitably energized windings, the current which is induced in a movable closed-circuit winding coacts with the magnetic flux of one or more other suitably energized windings to produce an operating force for controlling the movement of the closed-circuit winding according to a desired relation between the electric quantities energizing the windings. The operating force may be in the form of a torque T which is in general represented by the vectorial expression $$T = K_1(X-W)Y + K_2(X-W)Z + K_3(Y-Z)^2 + K_4(X-W)^2$$

in which W, X, Y and Z represent electric quantities such as the currents and voltages applied to the energizing windings; 10, 7, 8 and 9, as shown in Fig. 4, and $K_1$, $K_2$, $K_3$ and $K_4$ constants dependent on the position of the closed-circuit winding 6 and the symmetry of the construction. This winding may comprise one or more turns and may take the form of a single or a double loop wherein both loops may or may not be coplanar. The magnetic structure may take the form of a laminated rectangular shaped closed loop 1, two opposite sides of which are interconnected by a laminated magnetic member 2 locally enlarged as at 3. Toward this enlargement, which may be cylindrical in form, as shown in some of the figures there extend from the other sides of the loop, polar projections 4 and 5 whose pole face configuration for certain applications may correspond to the shape of the enlargement so as to provide uniform annular air gaps. The closed-circuit winding or inductor ring 6 extends around the enlargement and is so mounted as to move freely in the air gaps, the ring being shown in the neutral position.

If the windings 7 and 10 on the magnetic member 2 are continuous as shown in Fig. 5, and this winding is energized by line voltage and one of the windings 8 or 9 energized by line current and the other by line voltage and the ring 6 is in the neutral position, the resulting torque is proportional to EI $\cos(\phi-\theta)-E^2$, and has a directional ohmic characteristic suitable for the starting units of distance relays.

For use either as an ohm unit or a starting unit, the $I^2$ or $E^2$ torque may be obtained by having the windings 7 and 10 separated and the windings 8 and 9 continuous as shown in Fig. 6. If the winding 7 is energized by line voltage and the windings 8 and 10 by line current, then the torque on the inductor ring 6 is proportional to $I^2-EI \cos(\phi-\theta)$. The device is then adapted for an ohm unit. If the winding 7 is energized by line current and the windings 8 and 10 by line voltage, then the torque on the ring 6 is proportional to EI $\cos(\phi-\theta)-E^2$. The relay element shown in Fig. 6 may accordingly be used as a starting unit.

In the relay element shown in Fig. 7, a portion 12 of the winding 8 is on the magnetic member 2 so that the current in this winding may produce in the member a flux which threads the inductor ring 6. In this arrangement, it will be obvious that the auxiliary winding 12 is a means for inducing a desired $I^2$ torque when the ring is in the neutral or some intermediate position. This is, in effect, a coarse way to control the desired $I^2$ torque and further refinement can be obtained by suitably controlling the position of the ring. While the above description is given on the basis of line voltage and current in the windings 7 and 8 respectively, for the sake of a concrete illustration, it is immaterial what the electric quantities applied to these windings are, since the torque controlling effect obtained by placing a portion of a polar projection winding on the cross member 2 can be secured regardless of the electrical quantities used to energize the winding.

In Fig. 1, I have illustrated my invention as embodied in distance relay protective apparatus using, for example, the relay structure shown in Figs. 6 and 7. For the purpose of illustration, the distance relay is shown connected to control the trip coil circuit of a circuit breaker 18 in a three-phase circuit having phase conductors 21, 22 and 23. As shown, the relay includes a time element device 19, an ohm unit 20 and a starting unit 24. The time unit 19, as illustrated, is of the spring-wound, quick-return, ratchet type with escapement control and has an energizing winding 25 for winding its spring. This winding is connected to be energized from a control bus 26 in a circuit including the contacts 14, 17 of the starting unit 24. The timing unit 19 has a circuit controlling member 27 which cooperates with two adjustably positioned contacts 29 and 30 to provide two independently adjustable time delays.

The starting unit 24 is similar to the embodiment of my invention shown in Fig. 6. The polar projection winding 8 and the winding 7 are connected in series to be energized in accordance with the voltage between the phase conductors 21 and 22 through suitable means such as a potential transformer 31. The winding 10 is connected to be energized in accordance with the current of the phase conductor 21. The torque on the ring 6 is accordingly dependent on $E_{21-22}I_{21} \cos(\phi-\theta) - E^2_{21-22}$ and the contacts 14 and 17 are maintained open until the directional torque exceeds the voltage restraining torque.

Because of power surges attendant on switching and subsequent to the clearing of faults, undesired operation of relays may occur. It has been found that faults are accompanied by low voltages and low power factors, whereas surges generally involve higher voltages and power factors. In order to avoid the undesired relay operation on surges, I provide means for distinguishing between voltage and current fluctuations accompanying surges and faults. As shown in Fig. 1, this means is applied to the starting unit 24 and includes a condenser 32 connected in series with the voltage winding 8 and across this condenser are connected the voltage winding 7 and a voltage responsive means 33 having a characteristic such as to pass a current which increases disproportionately with increasing voltage. The voltage responsive means may be of any suitable type, for example the material disclosed in United States Letters Patent 1,822,742, a saturating reactor or a gaseous discharge tube which breaks down at a certain voltage, examples of which are well known to the art. The condenser 32 is proportioned with respect to the inductance of the winding 7 to form a substantially resonant circuit at the frequency of the system voltage when the voltage is above a predetermined value, which is less than normal voltage, and to form a substantially resonant circuit with the winding 8 when the voltage applied to the windings 7 and 8 is below a predetermined value by reason of the current conducting change in the voltage responsive means 33. Then at voltages near normal the current in winding 7 will be large and the current in winding 8 small. Consequently, the $E^2$ restraining torque and hence the current pick-up of the relay will be relatively high and the current in the coil 8 and hence the torque on the ring 6 suitably limited. However, at low voltages the current in the winding 7 will be reduced to a negligible value thereby correspondingly reducing the current necessary to operate the relay. The current in the winding 8 is amplified, thereby causing the sensitivity of the relay to be materially increased. Consequently, not only is the starting unit extremely sensitive to fault conditions but also is it made much less liable to operate under surge conditions. This feature is rendered still more effective by reason of the fact that the current in the winding 8 is more lagging at voltages near normal so that the sensitivity of the starting unit is less at high power factor whereas at low voltages the current in winding 8 is less lagging, which insures operation of the starting unit on faults close to the station having a high power factor due to the presence of the arc. A second voltage responsive means 34, which may be similar to the voltage responsive means 33, may be connected across the winding 8 in order to accentuate the operating features just described.

The ohm unit 20 is substantially like the modifications of my invention shown in Fig. 7 in that it has the additional or auxiliary winding feature for introducing the desired $I^2$ torque. The current winding and its series related winding 12 are connected to be energized in accordance with the current in phase conductor 21 while the current winding 8 and its series related winding 12 are connected to be energized in accordance with the current in the phase conductor 22 for the purpose of giving the same ohmic indication on faults involving two or three phases. A condenser 35 and a reactor 36 connected as shown are suitably proportioned to provide the desired power factor for the circuit of the voltage winding 7.

On the occurrence of a fault to which the starting unit responds and closes its contacts 14, 17, the circuit of the time unit winding 25 is completed and at the same time the upper one of the contacts 17 of the ohm unit 20 is connected to the negative side of the bus 26. If the fault is within the distance for which the ohm unit is set to respond as determined by the setting of the first or low set tap of the resistor 37, it will close its contacts and thereby complete the circuit of the annunciator 39 and the circuit of the sealing-in relay 38 which operates to complete the trip coil circuit of the circuit breaker 18. If the fault is more distant, the ohm unit 20 does not operate but when the time unit contact 27 engages the contact 29, an auxiliary relay 40 is energized and then its contacts 41 change the resistance tap setting of the series resistance 37 of the ohm unit to a higher value. If the fault is now within the new setting of the ohm unit, the contacts 14, 17 of the ohm unit will close to effect tripping, as before. In this case, however, the relay 40, through the opening of its contacts 42, removes a short circuit from the annunciator 43 and, through the closing of its contacts 44, short circuits the annunciator 39. If the fault is still more distant but within the range of the starting unit 24, the ohm unit 20 will not operate but tripping will be effected when the contact 27 of the timing unit engages its contact 30. At the same time, an annunciator 45 is energized while the other two annunciators 39 and 43 remain deenergized. It will be observed that the annunciators thus provide a means for selectively indicating the different time control operations of the relay and for approximately indicating the location of the fault thereby saving considerable line patrolling.

The embodiment of my invention shown in Fig. 3 is substantially the same as the arrangement shown in Fig. 1 except that instead of employing a single ohm unit 20 whose ohmic setting is automatically changed by the operation of the time unit 19 through its control of the auxiliary relay 40, I use two separate ohm units 20 and 20', each having its own fixed ohmic setting at the resistance 37. The ohm units have also been illustrated without the additional control windings 12. As illustrated, the ohm units 20 and 20' have low and high settings respectively. Also, by reason of the omission of the auxiliary relay 40, the annunciators 39 and 43 are connected directly in series with the contacts 14, 17 of their respective ohm units 20 and 20'. The operation of this embodiment of my invention will be obvious from the description of the arrangement shown in Fig. 1.

Also, in Fig. 3, I have shown another voltage responsive means for providing a maximum torque under different phase relations between the circuit voltage and current depending on the magnitude of the circuit voltage. As illustrated, the voltage responsive means 33' is connected across the voltage winding 7 and may be a current limiting device whose resistance increases with increasing voltage, such for example as an iron-hydrogen resistor, examples of which are well known to the art. A condenser 32' may be connected in circuit with the voltage winding 8 and proportioned for substantial resonance therewith at line frequency. At normal voltage substantially all the current passes through winding 7 and thus provides a high $E^2$ torque while the voltage across the winding 8 is relatively small and the operating torque on the ring 6 is suitably limited. At low voltages, however, just the reverse occurs and a greater proportion of the total voltage is available across the winding 8 than before. The effect of this voltage may be somewhat amplified by the condenser 32' which also tends to improve the power factor of the circuit of the voltage winding 8 from the standpoint of burden and maximum torque angle. Consequently, the characteristics of the potential circuits in this figure are substantially like those of the arrangement shown in Fig. 1.

The arrangements shown in Figs. 1 and 3 are particularly adapted for protection against short circuits between phases. The embodiment of my invention shown in Fig. 2 provides similar protection against faults between a conductor and ground. In this figure only the A.-C. circuits are shown since the arrangement is otherwise similar to Fig. 3. In both the starting unit 24 and the ohm units 20, 20', the voltage windings 7, 8 are connected to be energized in accordance with the voltage to ground of conductor 21. The current windings 9 of the ohm units and winding 10 of the starting unit are connected to be energized in accordance with the current in the phase conductor 21 while the current windings 8 of the ohm units are connected to be energized in accordance with the residual current as shown. With the correct adjustment of the tapped autotransformer 46, the torque of the ohm units is then dependent on the positive phase sequence reactance of the line between the relay and the fault and hence the distance between the relay and the fault.

While I have shown in Figs. 1, 2 and 3 a relay for only one phase, the connections of the relays in the other phases will be obvious by analogy and, generally speaking, a relay for each phase is preferable. In Fig. 2 in order to complete the connections of the current transformers I have indicated the relays in the other phases by the rectangles 47, 48. While in Figs. 1, 2 and 3 I have illustrated my invention by a particular type of distance relay, it will be understood that this is a schematic showing and the invention is not limited to this particular relay.

Although I have shown and described my invention in considerable detail, I do not desire to be limited to the exact arrangement shown but seek to cover by the appended claims all those modifications that fall within the true spirit and scope of my invention.

What I claim as new and desire to secure by Letters Patent of the United States is:

1. In combination with an electric circuit, relay means having two interconnected windings connected to be energized in accordance with a voltage derived from the circuit and voltage responsive means having a characteristic such as to pass a current which varies disproportionately with change in voltage in circuit with one of said windings for amplifying the effect thereof under normal voltage conditions and for amplifying the effect of the other winding under abnormal voltage conditions.

2. A relay comprising a plurality of cooperating windings, one of said windings being a voltage winding and means connected in circuit with said winding for causing said winding to have a highly lagging current at high voltage and a less lagging current at low voltage including voltage responsive means having a conductivity dependent on the magnitude of the voltage applied.

3. Electroresponsive means comprising two windings, a condenser connected in series with one of said windings, voltage responsive means having a characteristic such as to pass a current which increases disproportionately with increasing voltage, said voltage responsive means and the other of said windings being connected across said condenser and said condenser being proportioned with respect to the inductance of said other winding to form a substantially resonant circuit with voltage of a given frequency applied to the windings when the voltage is above a predetermined value and to form a substantially resonant circuit with said one winding when the voltage applied to the windings is below a predetermined value.

4. In combination with an electric circuit, a relay having two windings connected to be energized in accordance with a voltage derived from the circuit, a condenser connected in series with one of said windings, voltage responsive means having a characteristic such as to pass a current which increases disproportionately with increasing voltage, said voltage responsive means and the other of said windings being connected across said condenser and said condenser being proportioned with respect to the inductance of said other winding to form a substantially resonant circuit at the frequency of the voltage applied to the windings when the voltage is above a predetermined value and to form a substantially resonant circuit with said one voltage winding when the voltage is below a predetermined value.

5. In combination with an electric circuit, a relay having two interconnected windings connected to be energized in accordance with a voltage derived from the circuit, and means for increasing the effect of one of said windings under one voltage condition and increasing the effect of the other winding under another voltage condition.

6. In combination with an electric circuit, relay means having two cooperating windings connected to be energized in accordance with a voltage derived from the circuit, and means for establishing under normal voltage conditions a parallel resonant circuit for one of said windings and for voltage below a predetermined value a series resonant circuit for the other of said windings.

7. In combination with an electric circuit, relay means having two windings connected in series to be energized in accordance with a voltage derived from the circuit, and means in circuit with said windings for amplifying the effect of one of the windings under normal voltage conditions and for amplifying the effect of the other winding when the voltage is below a predetermined value including a voltage responsive device having a characteristic such as to pass a current which varies disproportionately with change in voltage.

8. In combination, an alternating current electric circuit and an electroresponsive device comprising a movable member, means including two cooperating windings arranged when energized by two electric quantities derived from said circuit, one of which is voltage, to exert a torque on said member, and means dependent on the magnitude of the voltage for causing the relay to develop its maximum torque under differing phase relations of said quantities to provide a greater sensitivity under fault conditions than under surge conditions of the circuit.

ALBERT R. van C. WARRINGTON.